United States Patent
Cipriani et al.

(10) Patent No.: US 12,345,160 B2
(45) Date of Patent: Jul. 1, 2025

(54) SEAL LEAK GAS RECOVERY SYSTEM USING AN EJECTOR AND METHOD

(71) Applicant: NUOVO PIGNONE TECNOLOGIE—S.R.L., Florence (IT)

(72) Inventors: Sergio Cipriani, Florence (IT); Tiziano Pellegrini, Florence (IT); Giacomo Pampaloni, Florence (IT); Eugenio Quartieri, Florence (IT); Riccardo Beccaluva, Florence (IT); Stefano Rossin, Florence (IT)

(73) Assignee: Nuovo Pignone Tecnologie—S.R.L., Florence (IT)

( * ) Notice: Subject to any disclaimer, the term of this patent is extended or adjusted under 35 U.S.C. 154(b) by 0 days.

(21) Appl. No.: 18/279,743

(22) PCT Filed: Mar. 4, 2022

(86) PCT No.: PCT/EP2022/025080
§ 371 (c)(1),
(2) Date: Aug. 31, 2023

(87) PCT Pub. No.: WO2022/184324
PCT Pub. Date: Sep. 9, 2022

(65) Prior Publication Data
US 2024/0133310 A1    Apr. 25, 2024
US 2024/0229670 A9    Jul. 11, 2024

(30) Foreign Application Priority Data

Mar. 5, 2021   (IT) .................. 102021000005273
Mar. 1, 2022   (IT) .................. 102022000003764

(51) Int. Cl.
| | | |
|---|---|---|
| *F01D 11/04* | (2006.01) |
| *F04D 17/10* | (2006.01) |
| *F04D 29/10* | (2006.01) |
| *F16J 15/40* | (2006.01) |
| *F04D 29/08* | (2006.01) |
| *F04D 29/12* | (2006.01) |

(52) U.S. Cl.
CPC .............. *F01D 11/04* (2013.01); *F04D 17/10* (2013.01); *F04D 29/10* (2013.01); *F16J 15/40* (2013.01);
(Continued)

(58) Field of Classification Search
CPC ........ F01D 11/04; F04D 17/10; F04D 29/083; F04D 29/102–108; F04D 29/122–128;
(Continued)

(56) References Cited

U.S. PATENT DOCUMENTS 5,263,826 A * 11/1993 Baumann ................. B60S 5/02
                                                        417/310
6,345,954 B1 * 2/2002 Al-Himyary ........ F16J 15/3404
                                                        415/230
(Continued)

FOREIGN PATENT DOCUMENTS

| EP | 2829311 A1 | 1/2015 |
| JP | 2011 052620 A | 3/2011 |
| JP | 2012087724 A | 5/2012 |

*Primary Examiner* — Woody A Lee, Jr.
*Assistant Examiner* — Behnoush Haghighian
(74) *Attorney, Agent, or Firm* — Paul Frank + Collins P.C.

(57) ABSTRACT

The system comprises a rotary turbomachine, including dry gas seals. A seal leak gas collecting line fluidly connects the at dry gas seals to the seal leak gas inlet of the ejector. A seal leak gas discharging line fluidly couples the dry gas seals with a seal leak gas discharge at a discharge pressure, lower than the seal leak gas pressure. A leak discharge control valve along the seal leak gas discharging line is adapted to divert at least part of the seal leak gas in the seal leak gas discharging line. Also, a method for recovering seal gas leaking from a dry gas seal arrangement is disclosed.

2 Claims, 4 Drawing Sheets

(52) U.S. Cl.
CPC ............ *F04D 29/08* (2013.01); *F04D 29/104* (2013.01); *F04D 29/124* (2013.01); *F05D 2220/32* (2013.01); *F05D 2240/55* (2013.01)

(58) Field of Classification Search
CPC ........ F05D 2260/601; F05D 2260/6022; F16J 15/40; Y10T 137/5762
USPC .......................................... 137/312; 277/320
See application file for complete search history.

(56) References Cited

U.S. PATENT DOCUMENTS

| | | | | |
|---|---|---|---|---|
| 6,708,981 | B2* | 3/2004 | Hall | F16J 15/3404 |
| | | | | 417/372 |
| 7,574,297 | B2* | 8/2009 | Pauer | F02M 51/061 |
| | | | | 123/457 |
| 8,066,023 | B2* | 11/2011 | Hoffart | F25J 1/0022 |
| | | | | 137/312 |
| 8,986,640 | B1 | 3/2015 | Dube | |
| 11,835,183 | B1* | 12/2023 | Figueroa | F17D 5/005 |
| 2006/0243244 | A1* | 11/2006 | Kasbauer | F02D 41/3809 |
| | | | | 123/333 |
| 2008/0251129 | A1* | 10/2008 | Hoffart | F25J 1/0279 |
| | | | | 137/312 |
| 2013/0125747 | A1 | 5/2013 | Dube et al. | |
| 2016/0047392 | A1* | 2/2016 | Bernocchi | F04D 17/10 |
| | | | | 415/17 |
| 2018/0178160 | A1 | 6/2018 | Dube | |

\* cited by examiner

SEAL LEAK GAS RECOVERY SYSTEM USING AN EJECTOR AND METHOD

TECHNICAL FIELD

The subject-matter disclosed herein relates to turbomachines, and specifically to compressors, comprising dry gas seals. Embodiments of the present disclosure specifically refer to recovery of seal leak gas from dry gas seals.

BACKGROUND ART

Fossil fuels are still a major source of energy for the production of thermal power required in several industrial processes, including electric power generation. Attempts have been made to reduce the environmental impact of this energy resource. The cleanest fossil fuel is natural gas, mainly consisting in methane, since combustion of methane generates more thermal energy by mass than any other hydrocarbon, providing a great environmental benefit, as it produces remarkably less carbon dioxide and other pollutants that contribute to the environmental impact.

Nevertheless, extracting and transporting natural gas cause release of unburnt gas, mainly methane, in the atmosphere. This has severe implications in terms of environmental impact, since methane contributes to climate changes and in particular has a greenhouse effect. As a matter of fact, just as carbon dioxide, also methane traps heat in the atmosphere. The global warming potential (GWP), a measure of how much heat a greenhouse gas traps in the atmosphere up to a specific time horizon, of methane in a span of 100 years is about 28 times higher than that of carbon dioxide.

Efforts have therefore been made to reduce the amount of natural gas released in the atmosphere in the whole process of natural gas extraction, transportation and use.

A main role in this approach is played by rotary seals of gas compressors. Dry gas seals have become increasingly popular as non-contact seals to efficiently reduce leakages of process gas from centrifugal compressors or other turbomachines (Stahley, John S. "*Dry Gas Seals Handbook*", Copyright 2005 by PennWell Corporation, ISBN 1-59370-062-8). Dry gas seals use a flow of process gas to provide efficient non-contact sealing between a rotary shaft and a stationary seal. Dry gas seals require a flow of clean, dry gas to operate. Usually, the same gas processed by the compressor is used as sealing gas. Sealing gas is taken from the delivery side of the compressor and the compressor shall be operative to provide sufficiently pressurized sealing gas.

In compressors for processing natural gas, for instance in gas pipelines, the natural gas leakages from the dry gas seals are usually burnt in a flare, which avoids discharging natural gas in the atmosphere, but which anyhow produces greenhouse gas (carbon dioxide) and destroys an amount of valuable feedstock.

It has therefore been suggested to recover gas leaking from dry gas seals. Circuits for hydrocarbon recovery in centrifugal compressor systems using dry gas seals are disclosed in Sergio Cipriani et al: "*Turbomachinery Hydrocarbon Loss recovery Systems*", a paper presented at the Gas Turbines for Energy Network Symposium, Banff, Alberta, Canada, October 2019.

Similar issues arise in compressors used for processing refrigerants in a natural gas liquefaction system. Refrigerant fluids are often hydrocarbons, such as methane, or mixed refrigerants containing hydrocarbons. Refrigerant leakages from dry gas seals of refrigerant compressors raise similar issues as the release of hydrocarbons from pipeline compressors.

A continuing search has been directed to development of systems and methods for efficiently recovering gas leaking from dry gas seals of turbomachines and increasing the pressure thereof, such that the recovered leak gas can be reused as seal gas or passed to further treatment.

SUMMARY

According to embodiment disclosed herein, a system for recovering seal leak gas comprises a rotary turbomachine, including at least one dry gas seal. The system further includes an ejector having: a motive gas inlet at a motive gas inlet pressure, a seal leak gas inlet at a seal leak gas pressure, and a mixed gas outlet at a mixed gas outlet pressure higher than the seal leak gas pressure. A seal leak gas collecting line fluidly connects the at dry gas seal to the seal leak gas inlet of the ejector. A seal leak gas discharging line fluidly couples the at dry gas seal to a seal leak gas discharge at a discharge pressure, lower than the seal leak gas pressure. A leak discharge control valve provided along the seal leak gas discharging line is adapted to divert seal leak gas in the seal leak gas discharging line.

The leak discharge control valve is functionally connected to a flow parameter sensor adapted to detect a flow parameter of the seal leak gas in the seal leak gas collecting line towards the seal leak gas inlet of the ejector and controlled based upon the flow parameter detected by said flow parameter sensor.

In some embodiments the wherein the leak discharge control valve is a pressure-controlled valve and the flow parameter is a pressure in the seal leak gas collecting line. In other embodiments, the leak discharge control valve is a flowrate-controlled valve and the flow parameter is a flowrate in the seal leak collecting line.

The leak discharge control valve can divert the seal gas leaking from the dry gas seal(s) fully or partly towards the seal leak gas discharging line. For instance, if the ejector is non-operating for whatever reason, for instance because no or insufficient motive gas is available at the motive gas inlet of the ejector, or if an excess of seal gas leaks flow from the dry gas seals, which cannot be managed by the ejector alone. Provision of the leak discharge control valve increases the availability of the turbomachine, i.e. the conditions under which the turbomachine can operate.

According to another aspect, disclosed herein is a method for recovering a seal leak gas from a dry gas seal of a rotary turbomachine. The method comprises a step of operating the turbomachine and a step of feeding seal gas to the at least one dry gas seal. Moreover, the method comprises the step of recovering seal leak gas from the at least one dry gas seal and delivering the recovered seal leak gas to a seal leak gas inlet of an ejector at a seal leak gas pressure. The ejector further includes a motive gas inlet receiving a motive gas flow at a motive gas pressure, and mixed gas outlet. A mixed gas is delivered at the mixed gas outlet of the ejector at a mixed gas pressure higher than the seal leak gas pressure. The seal leak gas is at least partly diverted from the at least one dry gas seal to a seal leak gas discharge, at a pressure lower than the seal leak gas pressure through a leak discharge control valve, which is controlled based upon a flow parameter of the seal leak gas flowing in the seal leak gas collecting line. The flow parameter can be, for instance, the pressure or the flowrate.

Further features and embodiments of the system and of the method are disclosed here below and in the attached claims.

BRIEF DESCRIPTION OF THE DRAWINGS

Reference is now made briefly to the accompanying drawings, in which.

DETAILED DESCRIPTION

According to the present disclosure, a turbomachine, such as in particular a compressor, includes one or more dry gas seals. The dry gas seals are fed with seal gas, which is partly vented from the dry gas seal(s). The gas venting from the dry gas seals is referred to herein as seal leak gas.

To recover the seal leak gas, a recovery circuit is provided, including an ejector. The ejector boosts the pressure of the seal leak gas using a motive gas. In embodiments, where the turbomachine is a compressor, the motive gas and the seal gas can be compressed gas processed by the compressor. The ejector boosts the pressure of the seal leak gas, which can thus be delivered to the suction side of the compressor or to another recovery line for further processing.

Figure 1:
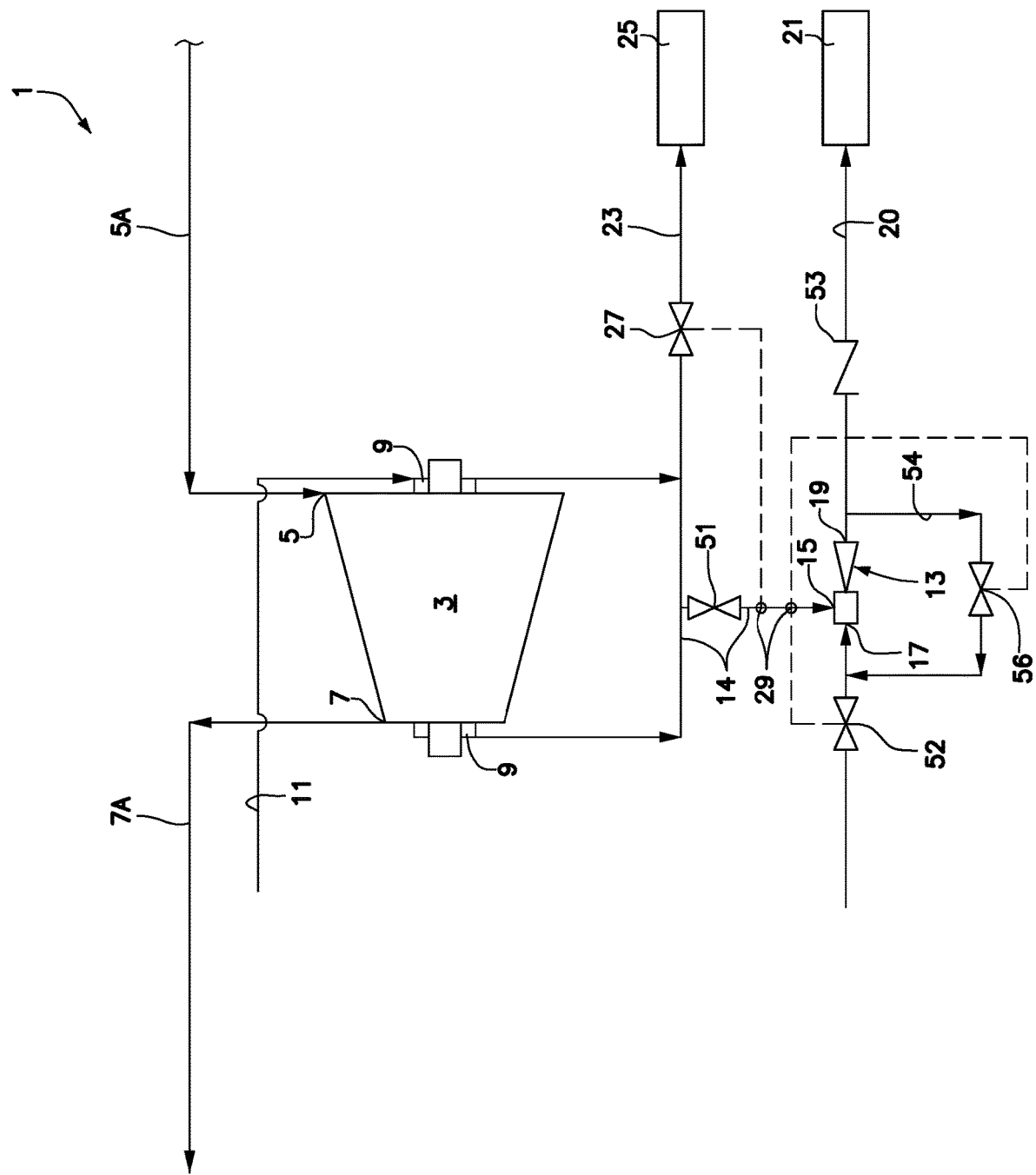
FIG. 1 is a schematic diagram of an embodiment of a system including a rotary turbomachine and an ejector for recovering seal gas leaking from dry gas seals of the turbomachine.

Referring now to FIG. 1, in a first embodiment the system 1 comprises a turbomachine 3 with an inlet 5 and an outlet 7. The inlet 5 is fluidly coupled with an inlet line 5A and the outlet 7 is fluidly coupled with an outlet line or deliver line 7A. In embodiments, the turbomachine 3 can be a compressor, for instance an axial compressor or a centrifugal compressor.

The turbomachine 3 includes one or more dry gas seals, for instance two dry gas seals 9. Seal gas is delivered to the dry gas seals 9 through seal gas delivery line 11. As known, a fraction of the seal gas delivered to the dry gas seals 9 is vented at low pressure from the turbomachine 3. Embodiments of the system of the present disclosure include an arrangement for recovering at least part of the seal leak gas and increase the pressure thereof so that the recovered seal leak gas can be further processed, for instance re-injected in the turbomachine, rather than discharged in the environment or burnt in a flare. In some embodiments, the dry gas seals 9 can include tandem dry gas seals, with a primary vent and a secondary vent. At least the primary vent is recovered and the pressure thereof increased for re-injection in the turbomachine or for other processing.

In order to increase the pressure of the seal leak gas, the system 1 includes an ejector 13 having a seal leak gas inlet 15, a motive gas inlet, and a mixed gas outlet 19. Seal leak gas venting from the dry gas seals 9 is collected in a seal leak gas collecting line 14, which connects the dry gas seals 9 to the seal leak gas inlet 15 of the ejector 13.

Seal leak gas enters the ejector 13 through the seal leak gas inlet 15 at a seal leak gas pressure and is entrained by a flow of motive gas delivered through a motive gas inlet line and entering the ejector 13 through the motive gas inlet 17 at a motive gas inlet pressure, higher than the seal leak gas pressure. The mixture of motive gas and seal leak gas exits the ejector 13 at a mixed gas outlet pressure through the mixed gas outlet 19, the mixed gas outlet pressure being lower than the motive gas inlet pressure but higher than the seal leak gas inlet pressure. The mixed gas exiting the ejector 13 can be delivered through a line 20 to any suitable treatment section 21.

A seal leak gas discharging line 23 fluidly couples the dry gas seals 9 to a seal leak gas discharge 25 at a discharge pressure lower than the seal leak gas pressure at the seal leak gas inlet 15 of the ejector 13. A leak discharge control valve 27 along the seal leak gas discharging line 23 is adapted to partly or entirely discharge the seal leak gas, vented from the dry gas seals 9, towards the seal leak gas discharge 25 when needed, depending upon the operating conditions of the turbomachine 3 and/or of the ejector 13. The leak discharge control valve 27 can be a pressure control valve, functionally coupled to a pressure sensor 29 adapted to detect the pressure at the seal leak gas inlet 15 of the ejector 13. In other embodiments, the leak discharge control valve 27 can be a flowrate control valve.

When the ejector 13 is unable to fully process the seal leak gas vented from the dry gas seals 9, e.g. because no or insufficient motive gas is available at the motive gas inlet 17, or if the flowrate of vented seal leak gas exceeds the ejector capacity, the leak discharge control valve 27 can divert part of the seal leak gas flowrate to the seal leak gas discharge 25, thus partializing, i.e. choking, the flowrate processed by the ejector 13. In some cases, e.g. if the ejector 13 is not operating, the seal leak gas can be entirely diverted through the leak discharge control valve 27 to the seal leak gas discharging line 23.

Using the leak discharge control valve 27 and the seal leak gas discharging line 23, the turbomachine 3 can operate also in circumstances where the ejector 13 is either inoperative or would not be able to process the entire seal leak gas flowrate from the dry gas seals 9. The availability of the turbomachine 3 is thus increased.

In some embodiments, in the seal leak gas collecting line 14 a non-return valve 51 can be provided, preferably upstream of the pressure sensor 29. A motive gas control valve 52 can be positioned in the motive gas inlet line, upstream of the motive gas inlet 17. A further non-return valve 53 can be positioned in line 20, through which the mixed gas is delivered from the ejector 13. The motive gas control valve can be a pressure control valve, i.e., a valve controlled by a pressure signal.

In some embodiments, in addition to, or instead of, the motive gas control valve 52, a recycle line 54 can be provided in anti-parallel to the ejector 13. The recycle line 54 has an inlet fluidly coupled to line 20, for instance between the mixed gas outlet 19 of the ejector 13 and the non-return valve 53. The recycle line 54 further has an outlet fluidly coupled with the motive gas inlet line, upstream of the motive gas inlet 17 of the ejector 13. A recycle control valve 56 is provided along the recycle line 54. The recycle control valve 56 can be a pressure-controlled valve, i.e., a valve controlled by a pressure signal.

The motive gas control valve 52 and the recycle control valve 56 can be controlled by a pressure signal, which can be generated by the pressure sensor 29 or another pressure detecting device. The function and operation of this arrangement will be explained in greater detail below, reference being made to FIG. 2.

As will clear from the description below of the control operations performed by the above-described valve arrangement, only valve 52 can be provided, or only valve 56 and relevant recycle line 54 can be provided in the system. In some embodiments, both valves 56 and 52 can be present and used alternatively, depending upon the implemented control mode.

Figure 2:
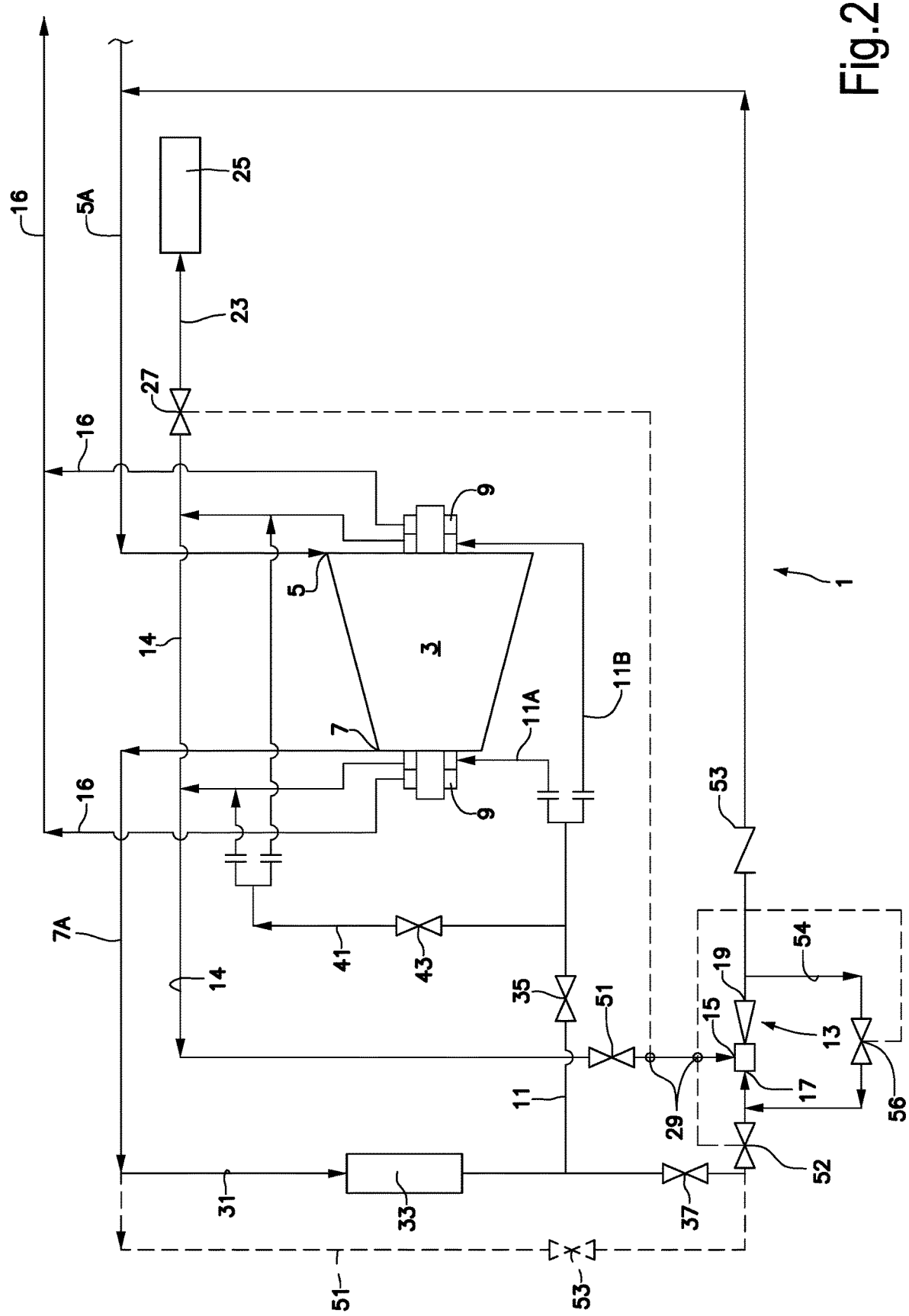
FIG. 2 is a schematic diagram of an embodiment of a system including a compressor and dry gas seals with a seal leak gas recovery arrangement using an ejector.

With continuing reference to FIG. 1, a further embodiment of a system according to the present disclosure is shown in FIG. 2. The system 1 of FIG. 2 includes a compressor 3, for instance a dynamic compressor such as a centrifugal compressor or an axial compressor. The compressor 3 comprises a suction side 5 fluidly coupled with an inlet line 5A and a delivery side 7 fluidly coupled with an outlet line or delivery line 7A.

The compressor 3 includes one or more dry gas seals, for instance two dry gas seals 9. The dry gas seals 9 can be single dry gas seals or tandem dry gas seals, with a primary vent and a secondary vent.

In the embodiment of FIG. 2, compressed process gas is extracted from the compressor or from the delivery line downstream thereof, is treated in a seal gas treatment unit 33 and used as seal gas for the dry gas seals 9. A line 31 diverts a small slip of compressed gas delivered by the compressor 3 towards the seal gas treatment unit 33, which is fluidly coupled with the dry gas seals 9, for instance through a single or multiple seal gas delivery line 11, 11A, 11B. A pressure reducing valve 35 is arranged between the seal gas treatment unit 33 and the dry gas seals 9 to reduce the gas pressure at a value suitable for injection in the dry gas seals 9.

In a manner known per se, the seal gas treatment unit 33 may include gas filters to remove impurities from the process gas prior to feeding the gas to the dry gas seals 9. Moreover, heating devices can be provided in the seal gas treatment unit 33, to heat the gas above the dew point, thus preventing moisture contained in the seal gas from condensing in the dry gas seals 9.

Similarly to FIG. 1, to recover seal leak gas vented from the dry gas seals 9, the system 1 of FIG. 2 includes an ejector 13 having a seal leak gas inlet 15, a motive gas inlet 17 and a mixed gas outlet 19. Seal leak gas venting from the dry gas seals 9 is collected in a seal leak gas collecting line 14, which connects the dry gas seals 9 to the seal leak gas inlet 15 of the ejector 13. In the embodiment of FIG. 2, the dry gas seals 9 are tandem dry gas seals having a primary vent collected in seal leak gas collecting line 14, and a secondary vent collected in a line 16 and discharged in the environment or delivered to a flare (not shown).

As in the system of FIG. 1, seal leak gas enters the ejector 13 through the seal leak gas inlet 15 at a seal leak gas pressure and is entrained by a flow of motive gas entering the ejector 13 though the motive gas inlet 17 at a motive gas inlet pressure, higher than the seal leak gas pressure. The mixture of motive gas and seal leak gas exits the ejector 13 through the mixed gas outlet 19 at a mixed gas outlet pressure lower than the motive gas inlet pressure, but higher than the seal leak gas inlet pressure.

In the embodiment of FIG. 2, the motive gas used in the ejector 13 is a small portion of compressed gas processed by the compressor 3 and slipped from the delivery side 7 of the compressor 3 and treated in the seal gas treatment unit 33. In the schematic of FIG. 2, only a portion of the gas delivered by the seal gas treatment unit 33 is used as seal gas in the dry gas seals 9. The remaining compressed and treated gas flow is delivered to the motive gas inlet 17 of the ejector 13. A motive gas control valve 37 can be provided between the seal gas treatment unit 33 and the motive gas inlet 17, to adjust the motive gas flowrate and/or the motive gas pressure at the motive gas inlet 17 of the ejector 13.

In the embodiment of FIG. 2, the mixture of motive gas and seal leak gas exiting the ejector 13 at the mixed gas outlet 19 is returned to the suction side 5 of the compressor 3. In some embodiments, the mixed gas can be processed through a suction scrubber (not shown) prior to entering the suction side 5 of the compressor 3.

A seal leak gas discharging line 23 fluidly couples the dry gas seals 9 to a seal leak gas discharge 25 at a discharge pressure lower than the seal leak gas pressure at the seal leak gas inlet 15 of the ejector 13. Seal leak gas flowing through the seal leak gas discharging line 23 can be delivered to a flare (not shown) or discharged in the environment. Only a small portion of the seal leak gas flows towards the seal leak gas discharge 25, when the ejector 13 is unavailable or is unable to process the entire seal leak gas flowrate received at the seal leak gas inlet 15.

A leak discharge control valve 27 along the seal leak gas discharging line 23 is adapted to partly or entirely discharge the seal leak gas vented by the dry gas seals 9 towards the seal leak gas discharge 25 when needed, depending upon the operating conditions of the compressor 3 and/or of the ejector 13. The leak discharge control valve 27 can be a pressure-controlled valve, functionally coupled to a pressure sensor 29 adapted to detect the pressure at the seal leak gas inlet 15 of the ejector 13. In other embodiments, the leak discharge control valve 27 can be a flowrate-controlled valve, or an actuated on-off valve.

For instance, if the compressor 3 is at standstill, the seal gas flow to the dry gas seals 9 shall be maintained, but the seal leak gas cannot be processed through the ejector 13, as no motive gas flow is available from the delivery side of the compressor 3. In this case, the small flowrate of seal leak gas flows through the leak discharge control valve 27 in the leak gas discharging line 23.

Other situations may occur, which require partializing the flow of seal leak gas flowing from the dry gas seals 9 to the ejector 13 through seal leak gas collecting line 14. For instance, partialization or choking may be required when the compressor 3 is operating in an off-design condition. In such case, a portion or the entire seal leak gas can flow towards the seal leak gas discharging line 23 through the leak discharge control valve 27.

A pressure sensor or a flowmeter may be provided to detect the pressure or the flowrate of seal leak gas in the seal leak gas collecting line 14.

In a way similar to the embodiment of FIG. 1, also in FIG. 2 a non-return valve 51 can be positioned in the seal leak gas collecting line 14, preferably upstream of the pressure sensor 29. A motive gas control valve 52 can positioned in the motive gas inlet line, upstream of the motive gas inlet 17. A further non-return valve 53 can positioned in line 20, through which the mixed gas is delivered from the ejector 13.

In some embodiments, in addition to, or in alternative to the motive gas control valve 52, a recycle line 54 can be provided in anti-parallel to the ejector 13, with an inlet fluidly coupled to line 20 and an outlet fluidly coupled to the motive gas inlet line, upstream of the motive gas inlet 17 of the ejector 13. A recycle control valve 56 can be arranged along the recycle line 54.

In some embodiments, only the motive gas control valve 52 can be provided and the recycle control valve 56 and relevant recycle line 54 can be omitted. Vice-versa, in other embodiments, the recycle line 54 and respective recycle control valve 56 can be provided, and the motive gas control valve 52 can be omitted.

The motive gas control valve 52 and/or the recycle control valve 56 can be controlled by a pressure signal, which can be generated by the pressure sensor 29 or by another suitable pressure detecting device.

The valve arrangements described so far can be used to manage the system in several transient situations, according to methods disclosed below.

According to an embodiment, the motive gas control valve 52 can be a pressure-controlled valve that modulates the motive gas flowrate as a function of the suction pressure of the leaking gas which has to be recovered from the compressor dry gas seals, i.e., as a function of the pressure in the seal leak gas collecting line 14. When the pressure detected by the pressure sensor 29, or any other sensing arrangement in the seal leak gas collecting line 14, increases the motive gas control valve 52 opens to increase the motive gas flowrate and thus the seal leak gas flowrate removed from the seal leak gas collecting line 14 through the ejector 13. If the seal gas leakages continue to increase, and therefore the pressure in the seal leak gas collecting line 14 increases once the motive gas control valve 52 is fully open, the leak discharge control valve 27 is gradually opened, to deliver a portion of the leaking seal gas towards the flare or other seal leak gas discharge 25. In this way the turbomachine, e.g. the compressor 3 can continue to operate under normal operating conditions.

If the pressure in the seal leak gas collecting line 14 drops, the leak discharge control valve 27 will gradually close again, under the control of the pressure signal from the pressure sensor 29, until the leak discharge control valve 27 is fully closed again. A further decrease of the pressure the pressure in the seal leak gas collecting line 14 under the set-point of the motive gas control valve 52, will cause the latter to start closing, to reduce the motive gas flowrate.

In particular when the turbomachine 3 is a compressor, the leak discharge control valve 27 is used when the compressor 3 is inoperative and/or at start-up i.e., when insufficient or no motive gas pressure is available to operate the ejector 13. Upon start-up, once the compression ratio of the compressor 3 achieves a sufficient value, pressurized motive gas can be diverted from the delivery line 7A towards the motive gas inlet 17 of the ejector 13 and the ejector 13 can start operating.

As the delivery pressure of the compressor 3 increases, the motive gas flowrate increases and the seal gas leaking from the dry gas seals and collected in the seal leak gas collecting line 14, which is initially fully discharged through the leak discharge control valve 27, starts flowing through the ejector 13.

The leak discharge control valve 27 can gradually close while the amount of motive gas increases. Eventually, the full seal gas leakage will be removed through the ejector 13 and the leak discharge control valve 27 will be fully closed. A smooth changeover from full leaking seal gas flow through the leak discharge control valve 27 to full leaking seal gas flow through the ejector 13 is thus achieved. The leak discharge control valve 27 will then remain closed unless the set-point of the motive gas control valve 52 is achieved under continuing increase of the pressure in the seal leak gas collecting line 14, as mentioned above.

The non-return valves 51 and 53 reduce or avoid counterflow towards the dry gas seals of the turbomachine 3.

A different mode of controlling the system can be performed using the recycle line 54 and the recycle control valve 56. In this case, the recycle control valve 56 can be partially or fully opened to recycle part of the mixed gas flowrate delivered through the mixed gas outlet 19. Specifically, the recycled flowrate is such that the ejector 13 operates in stable conditions, even if the leaking seal gas flowrate is reduced. The recycle control valve 56 is controlled based on the pressure detected by pressure sensor 29, or other suitable pressure detecting device, in the seal leak gas collecting line 14. When the pressure in the seal leak gas collecting line 14 increases, this means that a higher flowrate of the leaking seal gas shall be removed through the ejector 13. In response to said pressure increase in the seal leak gas collecting 14, the recycle control valve 56 partially closes, to reduce the stream recycled through the recycle line 54.

If the fully closed condition of the recycle control valve 56 is achieved and the pressure in the seal leak gas collecting line 14 still has to be reduced, the leak discharge control valve 27 can start opening and diverting part of the seal gas leaking from the dry gas seals towards a flare or any other seal leak gas discharge 25.

If, after opening of the leak discharge control valve 27 the pressure in the seal leak gas collecting line 14 decreases again, the leak discharge control valve 27 can gradually close and, if the pressure in the seal leak gas collecting line 14 continues to decrease once the setpoint of the recycle control valve 56 has been achieved and the leak discharge control valve 27 is fully closed, the recycle control valve 56 will start opening again gradually according to needs, under the control of the pressure signal from the pressure sensor 29.

The ejector 13 will thus operate in stable conditions and the compressor 3, or other turbomachine, can maintain normal operating conditions, under widely varying seal leak gas flowrate.

The leak discharge control valve 27 can be used at start-up of the turbomachine 3, in particular if this latter is a compressor and the motive gas for ejector 13 is provided by the process gas delivered by the compressor 3. Until sufficient compressor delivery pressure is achieved to operate the ejector 13, the seal gas leaking from the dry gas seals is fully discharged through the leak discharge control valve 27. Afterwards, when sufficient pressure in the motive gas stream is achieved, the ejector 13 can start operating and the leak discharge control valve 27 can be gradually closed. The recycle control valve 56 can remain fully closed or can be partly or fully opened according to needs, as described above.

A smooth changeover from full leaking seal gas flow through the leak discharge control valve 27 to full leaking seal gas flow through the ejector 13 is thus achieved also in this configuration. The leak discharge control valve 27 will remain closed unless the set-point of the recycle control valve 56 (recycle control valve 56 fully closed) is achieved under continuing increase of the pressure in the seal leak gas collecting line 14, as mentioned above.

While in the embodiments described above the control valve 52 and the control valve 56 are controlled using a pressure signal from the pressure sensor 29, the option is not excluded of using a different flow parameter of the seal leak gas in the seal leak gas collecting line, for instance the flowrate.

In some embodiments, a seal gas make-up line 41 can fluidly connect the seal leak gas collecting line 14 with the seal gas delivery line 11. A control valve 43 is provided along the seal gas make-up line 41. The valve 43 can be a pressure-controlled valve adapted to control a flow rate of seal gas from the seal gas delivery line 11 to the seal leak gas collecting line 14, in order to keep the seal leak gas pressure above a minimum threshold, which ensures proper operation of the second section of the tandem dry gas seals 9.

Figure 3:
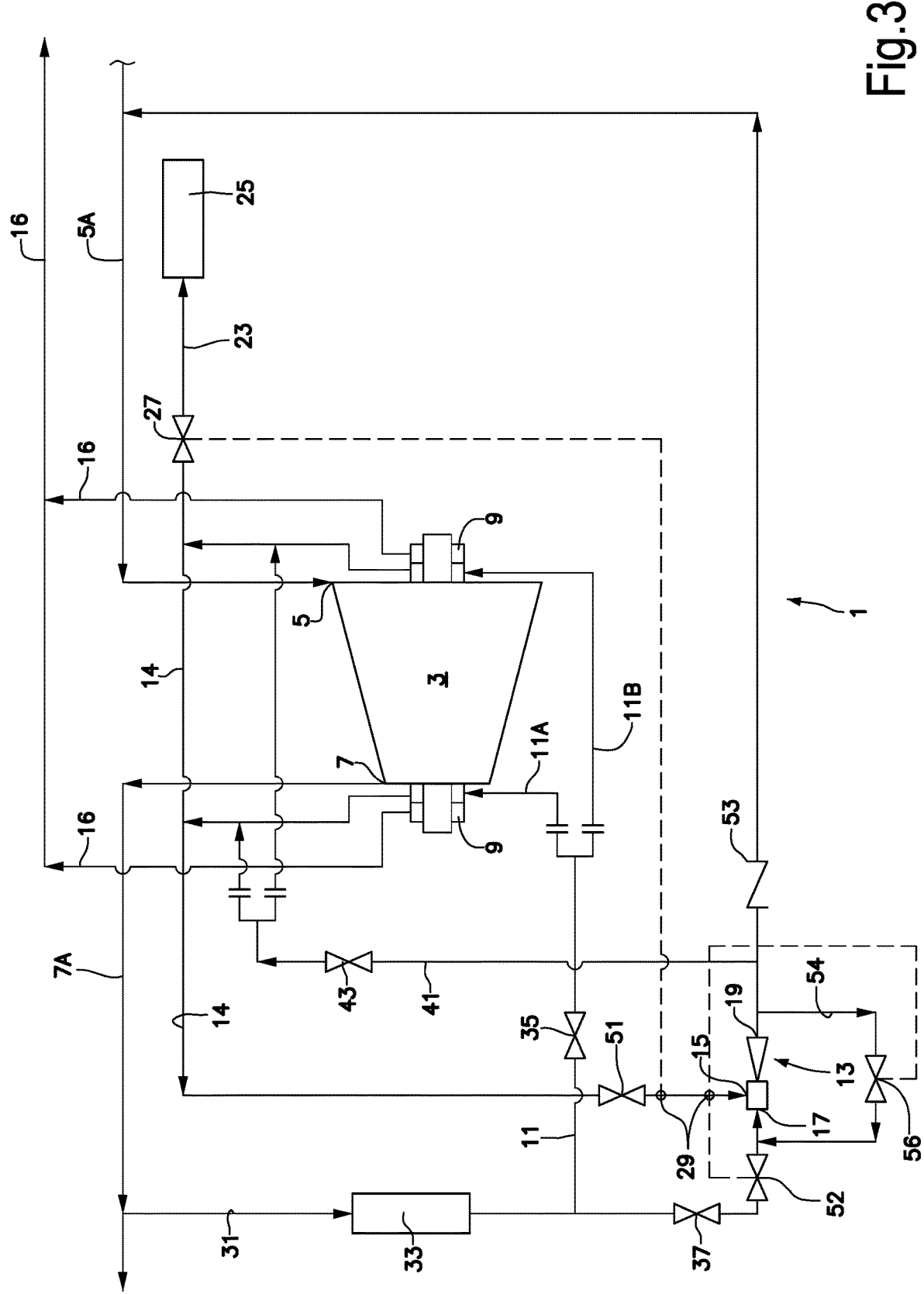
FIG. 3 is a schematic diagram of a further embodiment.

In the embodiment of FIG. 2, the seal gas make-up line 41 is connected to the seal gas deliver line 11 downstream the pressure reducing valve 35. In other embodiments, not shown, the seal gas make-up line 41 can be connected upstream the pressure reducing valve 35. In yet further embodiments, make-up seal gas can be taken from a different point of the circuit, for instance from the mixed gas outlet 19 of the ejector 13. This embodiment is shown in FIG. 3, where the other components of the system are labeled with the same reference numbers as in FIG. 2 and are not described again.

While in the embodiments described above the motive gas is taken from the flow of seal gas delivered by the seal gas treatment unit 33, since the motive gas does not require to be pre-treated as the seal gas, the flow of motive gas can be taken from the delivery side 7 of compressor 3 through a separate line 51, on which a flow control valve 53 is arranged, as shown in dotted line in FIG. 2.

In all embodiments disclosed herein, the turbomachine 3 can be operated in a wide range of operating conditions, also in off-design conditions, even if the ejector 13 is unable to process the entire seal leak gas vented by the dry gas seals, or is unavailable. Availability of the turbomachine 3 is increased, still using a very simple seal leak gas recovery system using an ejector to increase the pressure of the seal leak gas venting from the dry gas seals 9.

In the above-described embodiments motive gas inlet 17 of the ejector 13 is in fluid communication with the compressor delivery side and the motive gas entering the ejector may be at approximately the delivery pressure of compressor 3. However, in other embodiments, the motive gas inlet 17 can be fluidly coupled with an intermediate stage of the compressor 3, provided the process gas pressure at said stage is sufficiently high. In such case, the motive gas entering the ejector 13 is at a pressure between the suction side pressure and the delivery side pressure of compressor 3.

Figure 4:
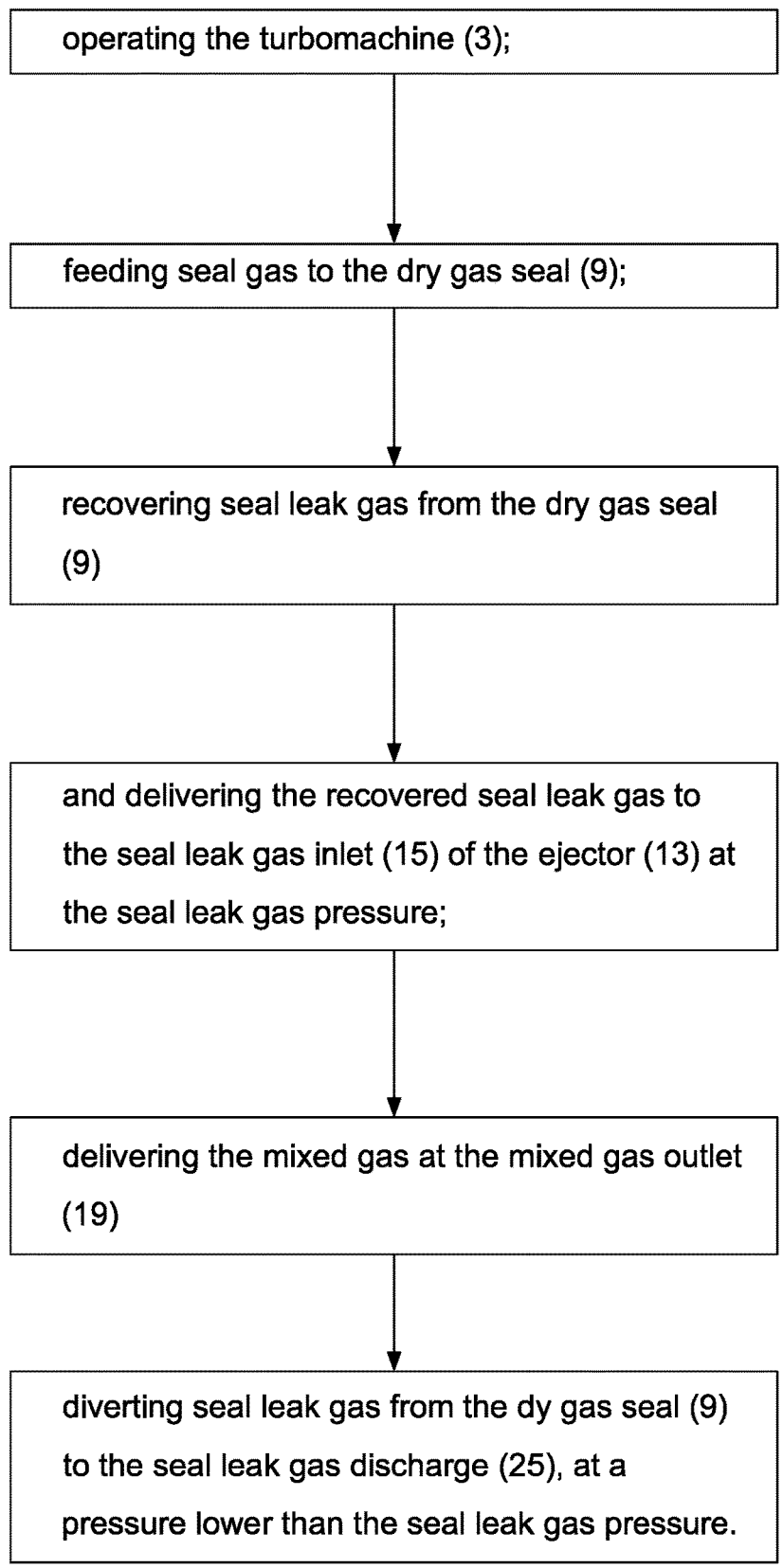
FIG. 4 is a flowchart summarizing the method disclosed herein.

The method performed by the system described above is summarized in the flowchart of FIG. 4. The method comprises the steps of: operating the turbomachine (3); feeding seal gas to the dry gas seal (9); recovering seal leak gas from the dry gas seal (9); delivering the recovered seal leak gas to the seal leak gas inlet (15) of the ejector (13) at the seal leak gas pressure; delivering the mixed gas at the mixed gas outlet (19); and diverting seal leak gas from the dry gas seal (9) to the seal leak gas discharge (25), at a pressure lower than the seal leak gas pressure.

Exemplary embodiments have been disclosed above and illustrated in the accompanying drawings. It will be understood by those skilled in the art that various changes, omissions and additions may be made to that which is specifically disclosed herein without departing from the scope of the invention as defined in the following claims.

The invention claimed is:
1. A system, comprising:
a rotary turbomachine comprising a dry gas seal;
an ejector comprising:
   a motive gas inlet at a motive gas inlet pressure,
   a seal leak gas inlet at a seal leak gas pressure, and
   a mixed gas outlet at a mixed gas outlet pressure that is higher than the seal leak gas pressure;
a seal leak gas collecting line fluidly connecting the dry gas seal to the seal leak gas inlet of the ejector;
a seal leak gas discharging line fluidly connecting the dry gas seal to a seal leak gas discharge at a discharge pressure that is lower than the seal leak gas pressure;
a leak discharge control valve disposed along the seal leak gas discharging line between the dry gas seal and the seal leak gas discharge;
a flow parameter sensor coupled to the leak discharge control valve, the flow parameter sensor in position to detect a flow parameter on the seal gas collecting line at the seal leak gas inlet of the ejector; and
a seal gas make-up line having an inlet and an outlet, the inlet fluidly coupled with the mixed gas outlet of the ejector, and the outlet fluidly coupled with the seal leak gas collecting line and adapted to feed make-up gas to the seal leak gas collecting line,
wherein the leak discharge control valve opens to allow flow of the seal leak gas though the seal leak discharging line into the seal leak gas discharge in response to the flow parameter detected by the flow parameter sensor indicating that no flow of motive gas enters the motive gas inlet of the ejector.

2. A system, comprising:
a rotary turbomachine comprising a dry gas seal;
an ejector comprising:
   a motive gas inlet at a motive gas inlet pressure,
   a seal leak gas inlet at a seal leak gas pressure, and
   a mixed gas outlet at a mixed gas outlet pressure that is higher than the seal leak gas pressure;
a seal leak gas collecting line fluidly connecting the dry gas seal to the seal leak gas inlet of the ejector;
a seal leak gas discharging line fluidly coupling the dry gas seal to a seal leak gas discharge at a discharge pressure that is lower than the seal leak gas pressure;
a leak discharge control valve disposed along the seal leak gas discharging line between the dry gas seal and the seal leak gas discharge;
a flow parameter sensor coupled to the leak discharge control valve, the flow parameter sensor in position to detect a flow parameter on the seal gas collecting line at the seal leak gas inlet of the ejector; and
a make-up control valve along the seal gas make-up line and adapted to control one of a make-up gas flowrate towards the seal leak gas collecting line and a make-up gas pressure in the seal leak gas collecting line,
wherein the leak discharge control valve opens to allow flow of seal leak gas through the seal leak discharging line into the seal leak gas discharge in response to the flow parameter detected by the flow parameter sensor indicating that no flow of motive gas enters the motive gas inlet of the ejector.

\* \* \* \* \*